Figure 4:
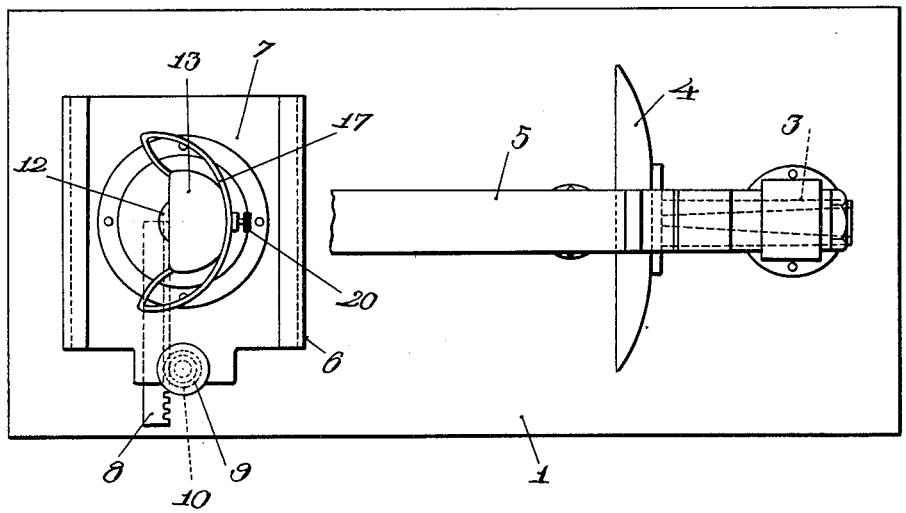

June 8, 1965  KATSUJI OMOTO  3,188,653
METHOD OF ESTABLISHING THE LOCATION OF THE NODAL POINT OF THE
EYE WITH RESPECT TO FIXATION CONFIGURATIONS
Filed Feb. 21, 1958  6 Sheets-Sheet 1
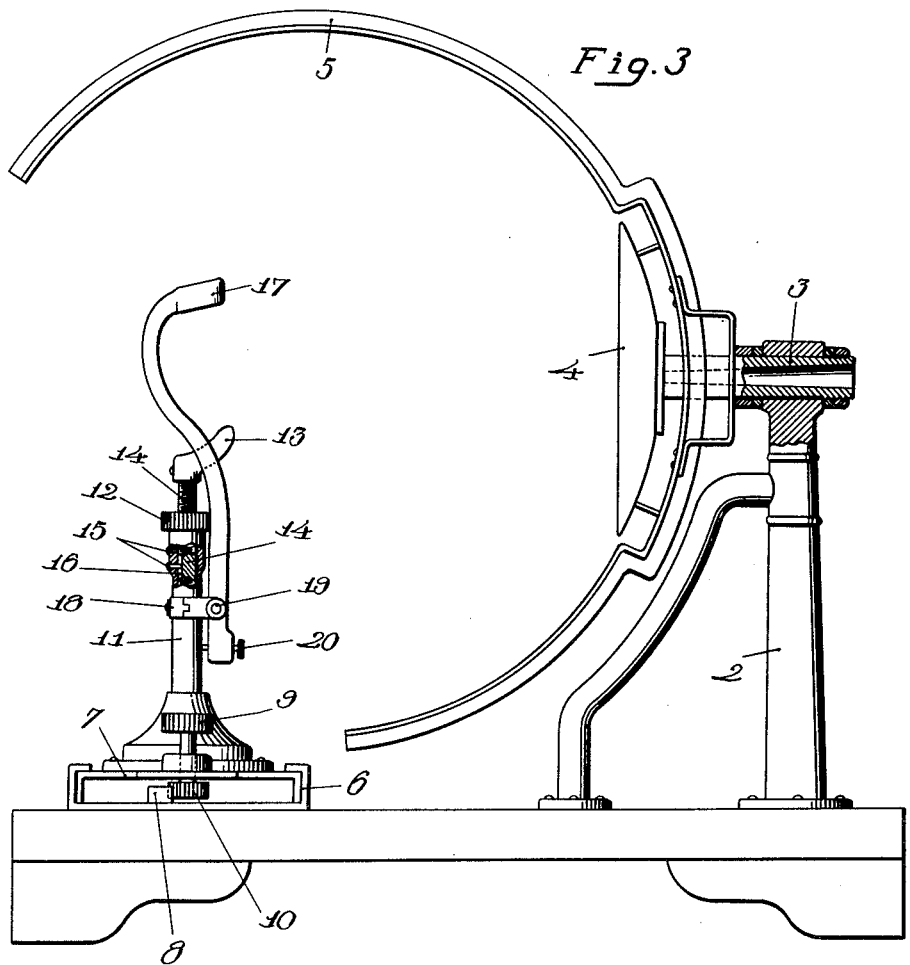
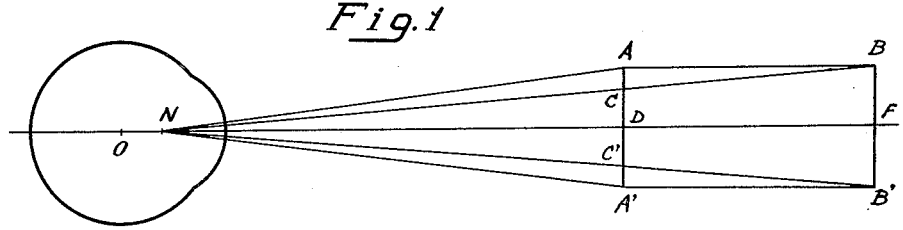

United States Patent Office 3,188,653
Patented June 8, 1965

3,188,653
METHOD OF ESTABLISHING THE LOCATION OF THE NODAL POINT OF THE EYE WITH RESPECT TO FIXATION CONFIGURATIONS
Katsuji Omoto, 462 Nishi Okubo 1-chome, Shinjukuku, Tokyo, Japan
Filed Feb. 21, 1958, Ser. No. 716,640
Claims priority, application Japan, Mar. 23, 1957, 32/6,868, 32/6,869; Aug. 16, 1957, 32/20,205, 32/20,206, 32/20,207; Sept. 20, 1957, 32/23,204, 32/23,205
2 Claims. (Cl. 351—39)

The present invention relates to methods for determining the position of an eye with respect to ophthalmic apparatus.

In general, a very important problem often encountered in ophthalmology is to make various measurements which involve fixing an eyeball and determining its position. Such measurements are useful for the diagnosis of eye trouble and are very useful in therapeutics. Heretofore, the position of the eyeball has been determined by aiming the eyeball at a point with the head fixed. Unfortunately, however, movement of the eyeball itself is not prevented even if a chin-rest or the like is used.

In measurements of the field of vision Förster's and Bjerrum's perimeters are used. In the former, the spherical disc and auxiliary arc are graduated by visual angles when an assumed nodal point is located at their centers and, in the latter, the plate is also graduated by visual angles.

The measurements of the field of fixation which can be directly seen by moving an eye with the head fixed, have been conventionally measured by using Förster's perimeter. These are deficient in that the motions of the eye ball around the point of rotation thereof as a center cannot be clearly shown.

The measurement of the near point to measure the adjusting power of an eye has been carried out by measuring the distance from the lower edge of the eye orbit or the apex of the cornea to the nearest position of a visible target. However such measurement of the near point is inaccurate.

In examining the converging function of eyes whereby the lines of fixation of the eyes will converge toward an eye-fixed object, the nearest point of convergence is measured. In such a case, theoretically speaking, the distance from the point of rotation of the eye should be measured, but since there isn't any known method to do this, such function has been determined by measuring the distance from the apex of the cornea as a matter of convenience. Therefore the conventional method of measuring the near point of fixation is not theoretical and inaccurate.

In examining stereoscopic vision the sharpness or accuracy of depth perception namely the sum of the visual angle of both eyes for the smallest perceivable depth is measured. However these measurements are deficient in the same manner as the measurement of the converging function.

The main object of the present invention is to eliminate the above mentioned defects and to fix the eyeball and determine its position very simply, quickly and accurately.

The method for fixing an eyeball and determining its position is characterized by seeing different similar parts placed in parallel at a predetermined interval so as to fix an eyeball and determine its nodal point.

Figure 5:
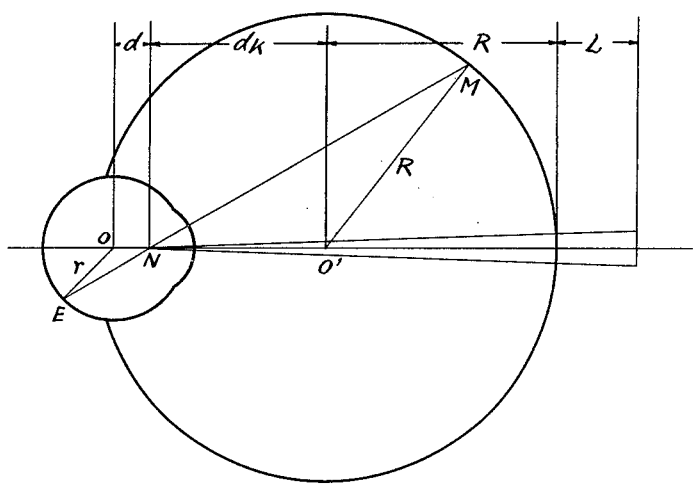
Figure 2:
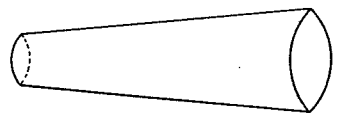
Figure 6:
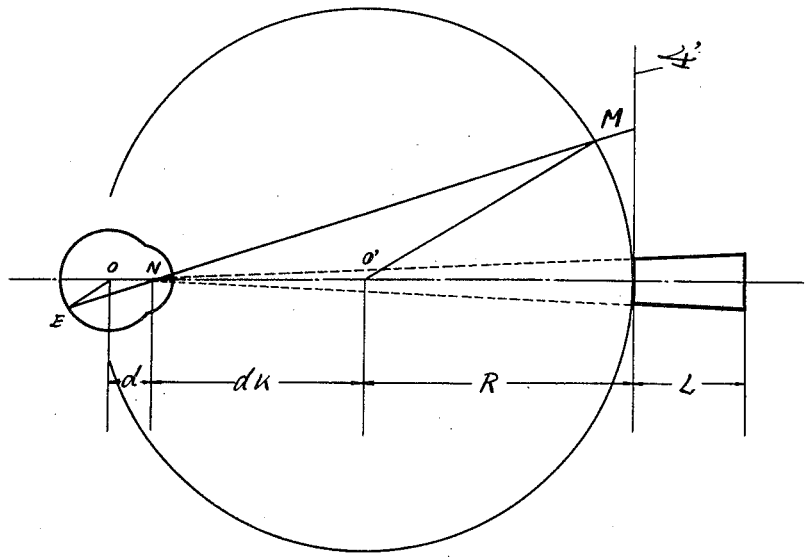
Figure 7:
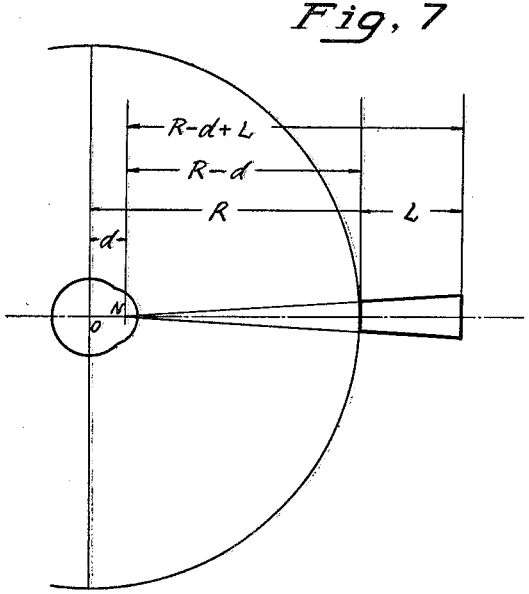
Figure 8:
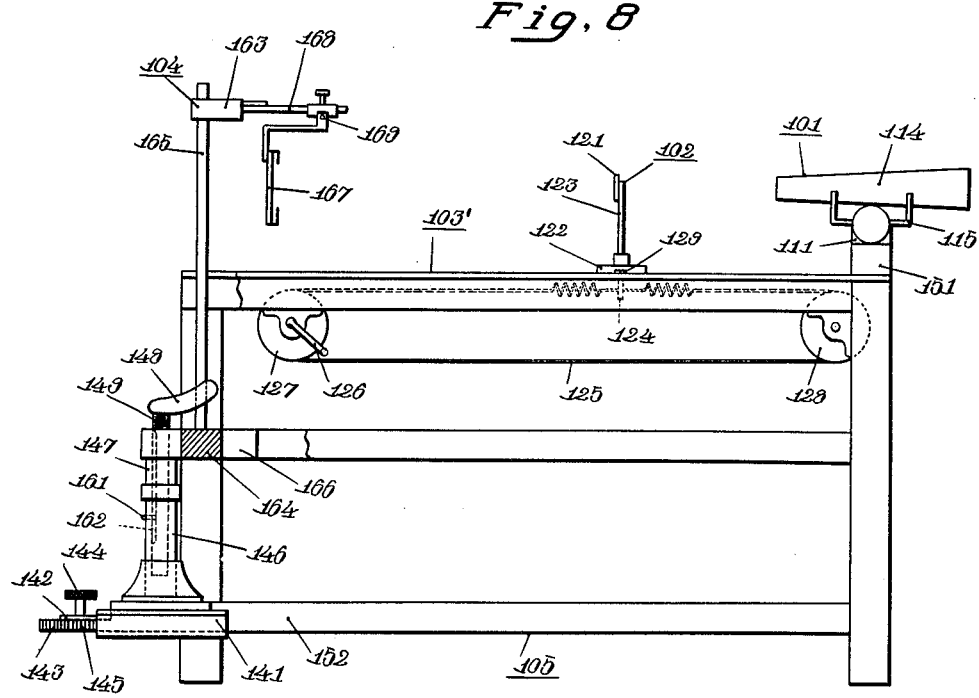
Figure 9:
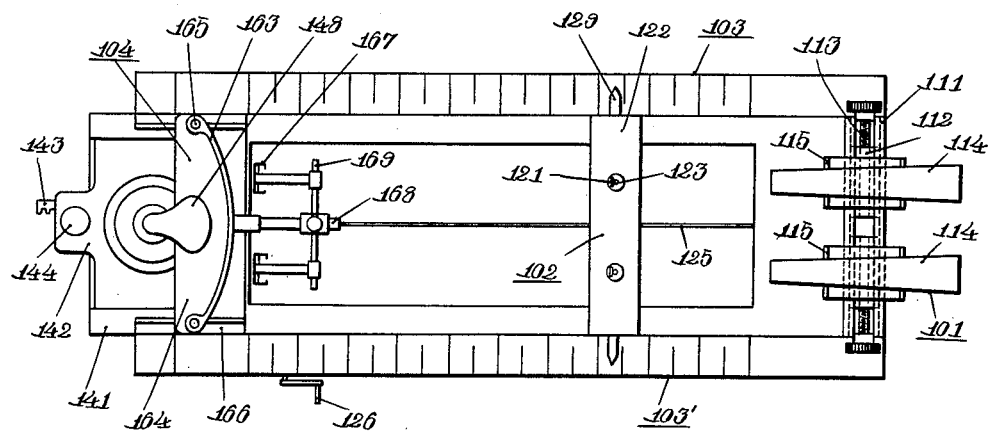
Figure 10:
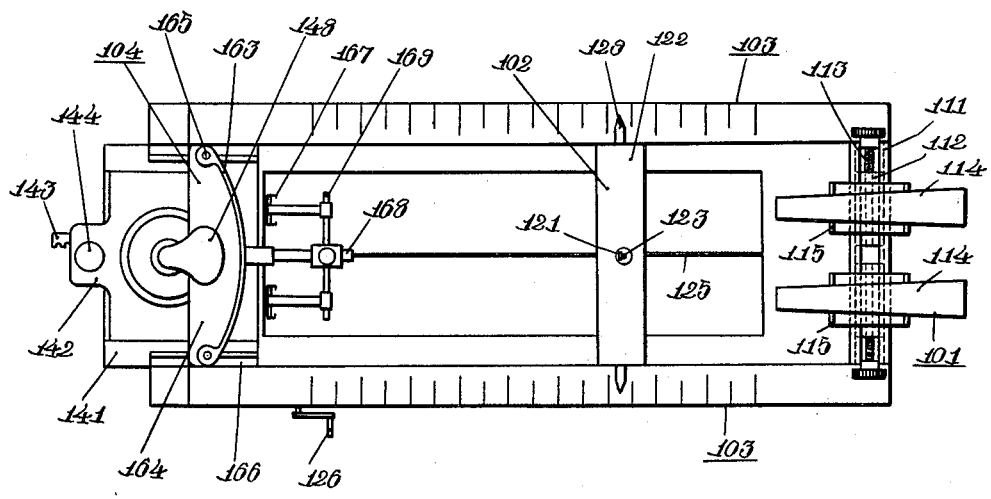
Figure 11:
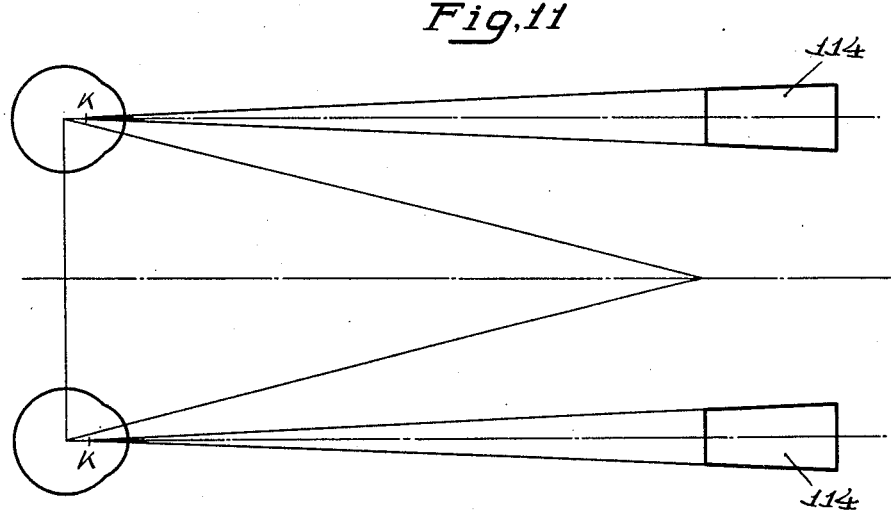
Figure 12:
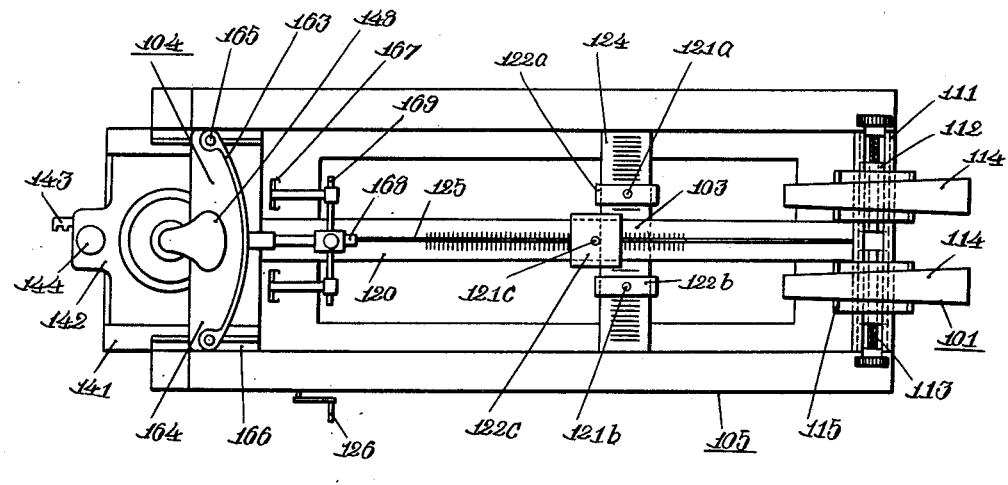
Figure 13:
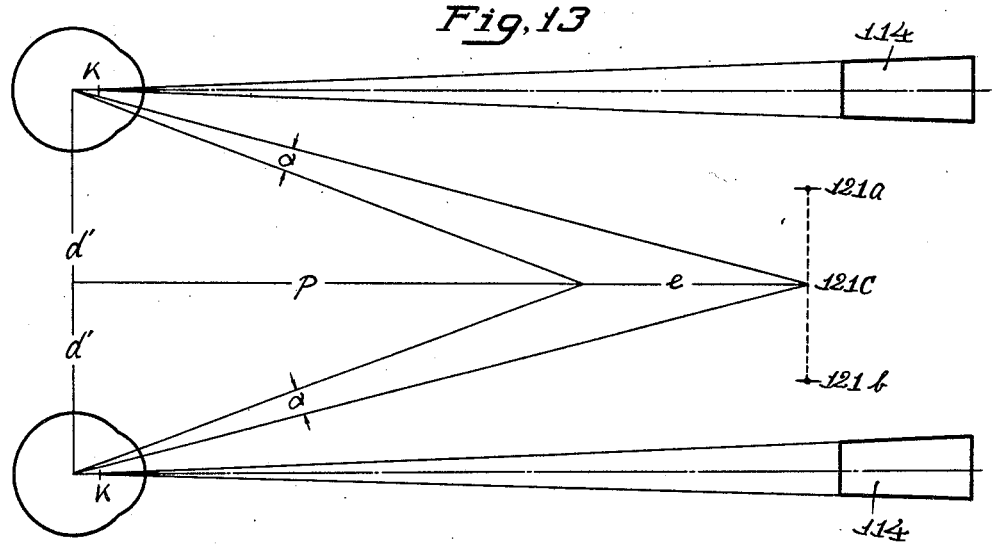

In order that the present invention may be more clearly understood reference will now be made to the accompanying diagrammatic drawings which show by way of example the preferred embodiments of the present invention and in which:

FIGURE 1 is a diagram explaining the principle of the present invention.
FIGURE 2 is a perspective view showing the eye-fixer.
FIGURE 3 is a side view of a perimeter according to the present invention.
FIGURE 4 is a plan view of the same.
FIGURE 5 is a diagram explaining the above principle.
FIGURE 6 is a diagram explaining the principle of a campimeter according to the present invention.
FIGURE 7 is a diagram explaining the principle of a fixation perimeter according to the present invention.
FIGURE 8 is a side view of an optical device according to the present invention.
FIGURE 9 is a plan view of the same.
FIGURE 10 is a plan view of a further optical device according to the present invention.
FIGURE 11 is a diagram explaining the above principle.
FIGURE 12 is a plan view of an apparatus for measuring depth perception according to the present invention.
FIGURE 13 is a diagram explaining the above principle.

In FIGURE 1, when a distant point is seen through a hollow cylinder $AA'B'B$ located in front of an eyeball, said cylinder will be in a state wherein the circle of the outside opening $BB'$ will be seen within that of the inside opening $AA'$ and, thus, two concentric circles will appear. Therefore, when the closer opening $AA'$ is progressively contracted, these two concentric circles will progressively coincide with each other and finally be seen as one circle. This is the case wherein the visual angle of point $C$ is equal to that of point $B$. Thus, when the truncated cone $CC'B'B$ is seen as one circle, the points $B$, $C$ and the nodal point $N$, and the points $B'$, $C'$ and the nodal point $N$ respectively will be on the same straight lines. As a result the triangles $NCC'$ and $NBB'$ will be similar to each other and $ND/NF=CC'/BB'$, where the points $D$ and $F$ are center points of $AA'$ and $BB'$.

Therefore, when a distant point is to be seen through the hollow truncated cone $CC'B'B$ located in front of the eyeball, if $CC'/BB'=ND/NF$, this hollow truncated cone $CC'B'B$ will be seen as one circle.

For the sake of the explanation, the inside and outside openings of the truncated cone are considered as visually perceived parts (FIG. 2). A channel and other shapes may also be employed. The visually perceived parts may exist individually.

When the device comprising the above hollow truncated cone is placed in front of the position wherein the eyeballs is to be fixed and determined in its position and when a distant point is seen through said device, if the truncated cone is seen as one circle, the position of the eyeball at such time will be the determined position. This fixation of the eyeball and determination of its position are so simple, quick and accurate as to require little effort. Further, the distance from the nodal point to the determined position can be thereby accurately measured. Accordingly, this device can be applied to a perimeter determining and other ophthalmic apparatus.

The perimeter according to the present invention will be explained in detail with reference to FIGURES 3, 4 and 5.

An apparently cylindrical supporting shaft 3 is horizontally provided at the upper end of a stay 2 fixed to a base 1. A hollow part in the form of a truncated cone in which the ratio of the radii of the inside and outside openings is equal to the ratio of the distances from the nodal point to those openings is formed in said shaft 3. A cut spherical disc 4 is secured to the inner side or face side of said shaft 3. Further an auxiliary arc 5 of the same radius of curvature as that of said disc 4 is rotatably fitted in the rear of said disc. An upper plate 7 is slidably supported on a base plate 6 fixed to the base 1 and is movable to the right and left by means of a rack 8 fixed to the base plate 6 and a pinion 10 provided with a handle 9 attached to said plate 7. A supporting tube 11 is fixed to the upper plate 7. A threaded shaft 14 of a chin-rest 13 is screwed into an adjusting tube 12 rotatably connected to said supporting tube 11. Further, the forward end of a set screw 15 screwed into said supporting tube 11 is made to project into a vertical groove 16 provided in said threaded shaft 14. A forehead-rest 17 is pivoted by means of a shaft 19 to a ring 18 fitted in vertically adjustable manner to the outside of the supporting tube 11 and its inclination is adjusted by means of an adjusting screw 20.

The perimeter is arranged with the hollow part in the form of the truncated cone in the center of the cut spherical disc so as to coincide with the inside surface of the disc. If the length of the hollow part is L, the radius of the disc is R, the radius of the eyeball is $r$, the distance between the center of the eyeball and the nodal point is $d$ and $R/r=K$, the ratio of the radii of the inside and outside openings of the hollow part will be $$(dK+R)/(dK+R+L)$$

In FIGURE 5, the above relation is shown, O is the center of the eyeball being examined, N is its nodal point and O' is the center of the sphere including the disc of the perimeter. Now, when the distance between the center O of the eyeball and the center O' of the perimeter is located so as to be $d(1+K)$, the eyeball and the perimeter will be aligned and will have the nodal point N as a center of similarity. That is to say, as illustrated, if any one point M on the arc corresponds to one point E on the retina of the eyeball, assuming that N' is an intersection of lines ME and O'O, $\triangle N'O'M$ will be similar to $\triangle N'OE$ and the interesection N' of ME and O'O will always coincide with N, because $N'O'/N'O=R/r=K$.

According to the perimeter, in case the field of vision of the right eye is to be measured, the face is supported by the chin-rest 13 and forehead-rest 17 and handle 9 is controlled so that the right eye may see a distant point through the hollow part in the form of a truncated cone located in the center of the cut spherical disc 4, the level of the right eye is adjusted by means of the adjusting tube 12 so as to be the same as that of the hollow part and then the inclination of the face and therefore the forward or rearward displacement of the eyeball is adjusted by means of the inclination adjusting screw 20 so that the hollow part may be seen as one circle. As a result, the right eye will see the hollow part as a single circle. In this case, as described above, the interrelation between the right eye and the perimeter will very simply, quickly and accurately be positioned to keep the relation of similarity. Here the field of vision can be examined by moving the test object on the auxiliary arc 5. The same will be the case in the left eye.

The campimeter device of the present invention will be explained with reference to FIGURE 6.

The campimeter device is provided with plate 4' instead of the disc and arc in the above mentioned perimeter device. The fundus and the spherical surface in contact with the plate 4' will be always in corresponding relation having the nodal point as a center of alignment, such as with the above perimeter device. Therefore, the graduations on the plate which are the graduations on the spherical surface as projected from the nodal point onto said plate will also be in a corresponding relation. Thus, the condition of the deformation of the fundus, that is, the position, shape and size of the fundus can be represented accurately from the result of the measurement.

The fixation perimeter according to the present invention will be explained with reference to FIGURE 7.

In the fixation perimeter, a hollow truncated cone in which the ratio of the radius of the inside opening to that of the outside opening is $(R-d)/(R-d+L)$, where R is the radius of the arc of the fixation perimeter, $d$ is the distance between the point of rotation and the nodal point of the eye to be examined and L is the distance between the inside and outside openings, is fixed on the center of the cut spherical member. Therefore, due to said cone, the point of revolution of the eye to be examined will coincide with the center of the fixation perimeter. Thus, the range that can be directly seen by the motion of the eyeball around the point of rotation as a center can be accurately obtained from the result of the measurement.

A further optical device according to the present invention will be explained with reference to FIGURES 8 and 9.

In the device in FIGS. 8 and 9, the eye-fixer 101, the test object 102, the scale plate 103' and the face supporting device 104 are mounted on a frame 105. In the eye-fixer 101, a base member 111 is provided on a cross member 151 in the rear part of the frame 105. A sliding member 112 which is engaged with said cross member 151 and can slide is made movable to the right and left, that is, to be opposite to the pupillary position by means of a screw 113. The hollow truncated cone 114 is attached to the sliding member 112 through a rest metal piece 115. In the test-object 102, a target plate 121 is attached to an upright rod 123 of a sliding plate 122. A cable 125 is attached to the leg 124 of the sliding plate 122 so that said sliding plate may move forward and rearward in the middle part on the upper surface of the frame 105. Cable 125 is wound on a front pulley 127 to which a handle 126 is fixed and on a rear pulley 128. The pointer 129 is provided on the side part of the sliding plate 122 so that the position of the target plate 121 can be read. The scale plate 103' is attached to the upper surface of the frame 105. The scale is graduated so that the distance from the apex of the hollow truncated cone 114 of the eye-fixer 101 to the test object 102 can be indicated by the pointer 129. In the face supporting device 104, a sliding plate 142 is supported on a base plate 141 fixed to the lower part 152 of the frame 105 on the side of the person whose eyes are to be examined. A pinion 145 attached to the sliding plate 142 and having a knob 144 is engaged with a rack 143 fixed to the base plate 141 so that the sliding plate 142 can be movable forward and rearward. A supporting tubular member 146 is fixed to the sliding plate 142, a screw rod 149 of a chin-rest 148 is engaged with a rotary tubular member 147 rotatably attached to the supporting tubular member 146 and the forward end of a stopper screw 161 attached to the supporting tubular member 146 is projected in a vertical groove 162 provided in the screw rod 149 so that the chin-rest 148 can be vertically adjusted. Further, a forehead-rest 163 is supported by pillars 165 provided at the right and left end parts of a cross member 169 supporting the rotary tubular member 147 and the right and left ends of said cross member 164 are supported so as to be slidable on bearing members 166. Further the glass frames 167 are fixed to supporting rods which can slide on a cross rod 169 supported by a frame support 168 projected from the forehead-rest 163 and can be adjusted forward and rearward and to right and left, that is, so as to correspond to the positions of the pupils.

Therefore, when a face is supported by the face supporting device 104, that is, by the chin-rest 148 and the forehead-rest 163 and when the glass frame 167 and the hollow truncated cone 114 are set opposite the eyeball to be examined, if, for example, the near point of the right eye is to be measured, the left glass frame 167 will be properly covered and the face will be moved forward and rearward by operating the knob 144. Thus when the hollow truncated cone 114 comes to be seen as one circle, then as shown in FIGURE 1, the inside and outside opening of the hollow truncated cone CC'B'B will be seen in the same visual angle and the apex N of the cone NBB' will become the nodal point of the eye. Therefore, in this position, if the sliding plate 122 is moved by the handle 126 to the nearest visible position of the target of the target plate 121, the distance from the nodal point to the near point can be measured by the graduation indicated by the pointer 129. In the case of hypermetropia, the measurement is made by fitting a lens to the glass frame 167. In case the near point of the left eye is to be measured, the right eye will be covered by the glass frame 167 and the measurement can be made in the same manner.

A further device according to the present invention will be explained with reference to FIGURES 10 and 11.

The device of FIGS. 10 and 11 is provided in apparatus similar to that described above and in which the test object 121 is movable in the medial plane of the face and the scale plate 103 is graduated to represent the sum of the distance from the apex K of the cone 114 and the distance between the nodal point and the point of rotation of the eye to be examined. Therefore, since the nodal point can be located on said apex K by means of said cone 114, the device of FIGS. 10 and 11 makes it possible to simply, quickly and accurately measure the distance from the point of rotation to the near point of convergence by reading the graduations of the scale 103.

The apparatus for measuring depth perception according to the present invention will be explained with reference to FIGURES 12 and 13.

The apparatus for measuring depth perception is provided in apparatus similar to that above and in which a three-rod apparatus is provided in front of the hollow truncated cone 114. The three-rod apparatus comprises upright rods 121a and 121b slidably mounted on a middle member 120 with a scale 103 and being movable along said middle member 120 by means of cable 125. The scale 103 is so graduated as to represent the sum of the distance from the apex K of said cone 114 and distance between the nodal point and the point of rotation of the eye to be examined. In FIGURE 13, if $2d'$ is the pupillary distance, P is the distance from the base line to the extreme inside point where the three-rod apparatus can be perceived on a line and $e$ is the depth perception difference. The angle of the depth perception can be expressed by the relation $2\alpha = 2d' \cdot e/P^2$. Thus the accuracy of depth perception can be theoretical and accurate, since the distance P is measured accurately.

The present invention is not limited to the embodiments herein before described and shown in the accompanying drawings, said embodiment being susceptible of various modifications with respect to its details, without departing from the scope of the invention.

What I claim is:

1. A method of establishing the location of the nodal point of an eyeball comprising positioning spaced parallel and similar configurations of different sizes from one another, viewing the configurations with the eyeball, with the larger of the configurations spaced further from the eyeball, adjusting the distance between the eyeball and the configurations until the latter apparently coincide, whereby the extension of lines joining corresponding points which coincide on each of the configurations defines a common intersection which corresponds to the nodal point of the eyeball, the distance from the configurations to the intersection being a measure of the position of the nodal point with respect to said configurations.

2. A method as claimed in claim 1 in which the configurations are of circular shape and said configurations are at the opposite extremities of a hollow truncated cone.

References Cited by the Examiner

UNITED STATES PATENTS

| 1,339,248 | 5/20 | Winder | 33—50 X |
| 1,693,979 | 12/28 | Ferree et al. | 88—20 |
| 1,946,925 | 2/34 | Ames | 88—20 |
| 1,953,738 | 4/34 | Allen et al. | 88—20 |
| 2,081,969 | 6/37 | Allen et al. | 88—20 |
| 2,362,588 | 11/44 | Shepard | 88—20 |
| 2,576,358 | 11/51 | Pritikin | 88—20 |

FOREIGN PATENTS

| 570,558 | 7/45 | Great Britain. |
| 439,277 | 9/48 | Italy. |

JEWELL H. PEDERSEN, *Primary Examiner*.

EMIL G. ANDERSON, WILLIAM MISIEK, *Examiners*.